US012373315B2

(12) United States Patent
Flynn et al.

(10) Patent No.: US 12,373,315 B2
(45) Date of Patent: *Jul. 29, 2025

(54) ELIMINATING DATA RESYNCHRONIZATION IN CYBER RECOVERY SOLUTIONS

(71) Applicant: Dell Products L.P., Hopkinton, MA (US)

(72) Inventors: Melissa Flynn, North Attleboro, MA (US); David Goncalves, Acushnet, MA (US); Evan Jones, Glenville, NY (US); Brett Quinn, Cotuit, MA (US)

(73) Assignee: Dell Products L.P., Hopkinton, MA (US)

( * ) Notice: Subject to any disclaimer, the term of this patent is extended or adjusted under 35 U.S.C. 154(b) by 135 days.

This patent is subject to a terminal disclaimer.

(21) Appl. No.: 17/994,439

(22) Filed: Nov. 28, 2022

(65) Prior Publication Data

US 2024/0176713 A1 May 30, 2024

(51) Int. Cl.
*G06F 11/00* (2006.01)
*G06F 11/20* (2006.01)

(52) U.S. Cl.
CPC ...... *G06F 11/2069* (2013.01); *G06F 11/2082* (2013.01); *G06F 2201/84* (2013.01)

(58) Field of Classification Search
CPC ............ G06F 11/2069; G06F 11/2076; G06F 2201/84; G06F 16/2365; G06F 16/273; G06F 16/275

See application file for complete search history.

(56) References Cited

U.S. PATENT DOCUMENTS

| 7,831,550 | B1 * | 11/2010 | Pande | G06F 16/275 |
| | | | | 707/610 |
| 9,311,242 | B1 * | 4/2016 | Banerjee | G06F 3/065 |
| 10,146,630 | B1 * | 12/2018 | Kumar | G06F 16/2237 |
| 10,476,955 | B2 * | 11/2019 | Mutalik | G06F 11/2094 |
| 10,484,179 | B1 * | 11/2019 | Natanzon | G06F 21/64 |
| 10,860,239 | B2 * | 12/2020 | Kucherov | G06F 16/27 |
| 11,467,778 | B2 * | 10/2022 | Degwekar | G06F 3/067 |
| 11,537,314 | B1 * | 12/2022 | Subramanian | G06F 3/067 |
| 12,039,182 | B2 * | 7/2024 | Haravu | G06F 3/0689 |
| 12,067,032 | B2 * | 8/2024 | Jain | H04L 67/10 |
| 12,166,820 | B2 * | 12/2024 | Karr | G06F 11/1471 |
| 12,181,981 | B1 * | 12/2024 | Heidemeyer | G06F 11/1469 |
| 2007/0180307 | A1 * | 8/2007 | Zohar | G06F 3/0607 |
| | | | | 714/E11.136 |

(Continued)

*Primary Examiner* — Loan L. T. Truong
(74) *Attorney, Agent, or Firm* — Anderson Gorecki LLP

(57) ABSTRACT

Recovery of a primary image is facilitated by using consistent snapshots on a primary storage array and consistent snapshots on a secondary storage array to avoid the need to transmit entire secondary replicas of storage objects from the secondary storage array to the primary storage array. Consistent snaps of the primary replicas are generated by the primary storage array. Consistent snaps of the secondary replicas are generated by the secondary storage array. The primary image is recovered by linking consistent snaps on the primary storage array to primary staging volumes, linking consistent snaps on the secondary storage array to secondary staging volumes, synchronizing the primary and secondary staging volumes, and migrating host IO traffic to the synchronized staging volumes.

17 Claims, 4 Drawing Sheets

(56) References Cited

U.S. PATENT DOCUMENTS

| | | | |
|---|---|---|---|
| 2007/0276885 A1* | 11/2007 | Valiyaparambil | G06F 11/1464 |
| 2012/0036106 A1* | 2/2012 | Desai | G06F 16/27 |
| | | | 707/645 |
| 2014/0164694 A1* | 6/2014 | Storer | G06F 11/2094 |
| | | | 711/114 |
| 2015/0089171 A1* | 3/2015 | Fujita | G06F 3/061 |
| | | | 711/162 |
| 2018/0260125 A1* | 9/2018 | Botes | G06F 11/2094 |
| 2019/0012238 A1* | 1/2019 | Butterworth | G06F 11/2048 |
| 2019/0026187 A1* | 1/2019 | Gulam | G06F 16/128 |
| 2019/0079682 A1* | 3/2019 | Bikumala | G06F 11/2097 |
| 2019/0163370 A1* | 5/2019 | Sure | G06F 11/0793 |
| 2019/0325055 A1* | 10/2019 | Lee | G06F 11/1448 |
| 2019/0347029 A1* | 11/2019 | Ramachandran | G06F 3/0673 |
| 2021/0133038 A1* | 5/2021 | Ling | G06F 16/178 |
| 2021/0357294 A1* | 11/2021 | Balcha | G06F 11/1458 |
| 2021/0406132 A1* | 12/2021 | Gupta | G06F 11/1464 |
| 2022/0027051 A1* | 1/2022 | Kant | G06F 3/0617 |
| 2022/0066883 A1* | 3/2022 | Wang | H04L 69/40 |
| 2022/0100608 A1* | 3/2022 | Yu | G06F 11/1446 |
| 2022/0121533 A1* | 4/2022 | Kumar | G06F 3/067 |
| 2022/0222152 A1* | 7/2022 | Kumar | G06F 11/1461 |
| 2022/0317897 A1* | 10/2022 | Subramanian | G06F 3/0689 |
| 2022/0398163 A1* | 12/2022 | Bezbaruah | G06F 11/2097 |
| 2023/0018975 A1* | 1/2023 | Sreenivasan | G06F 16/2379 |
| 2023/0093925 A1* | 3/2023 | Liguori | G06F 9/5077 |
| | | | 718/1 |
| 2023/0289327 A1* | 9/2023 | Patel | G06F 11/2097 |

\* cited by examiner

ELIMINATING DATA RESYNCHRONIZATION IN CYBER RECOVERY SOLUTIONS

TECHNICAL FIELD

The subject matter of this disclosure is generally related to disaster recovery operations in a data storage system.

BACKGROUND

Institutional data storage systems including storage area networks (SANs) and storage arrays are used to maintain storage objects that contain data used by instances of host applications running on host servers. Examples of host applications may include, but are not limited to, software for email, accounting, manufacturing, inventory control, and a wide variety of other institutional processes. Each storage object is a logical storage device that abstracts the storage space of non-volatile disk drives. A separate storage object or group of storage objects may be created for each host application.

It is known to configure multiple storage arrays to maintain replicas of a storage object in order to maintain availability of the host application data and avoid data loss. Production storage objects can be synchronously replicated by primary and secondary storage arrays such that the primary storage array can quickly failover to the secondary storage array. Synchronous replication is done in parallel by both storage arrays. A write IO is only acknowledged to the host-initiator after being committed to memory by both storage arrays. In order to achieve synchronous replication with low IO latency, high performance components, subsystems, and network links may be required. Production storage objects can be asynchronously replicated by a disaster recovery site storage array for use in the event of corruption or loss of the replica at the primary storage array. Asynchronous replication is not done in parallel, so IO latency is less of a concern. Updates to the replica at the primary storage array are accumulated over a predetermined time interval and sent to the disaster recovery storage array in batches according to a schedule. Although asynchronous replication does not provide the same failover capability as synchronous replication, the asynchronously replicated data can be sent back to the primary storage array for recovery of the replica on the primary storage array. Synchronously replicated data can also be transmitted between storage arrays for recovery of a replica.

SUMMARY

A method in accordance with some implementations comprises: maintaining a primary replica of a storage object on a primary storage system; generating consistent snapshots of the primary replica on the primary storage system; maintaining a secondary replica of the storage object on a secondary storage system; generating consistent snapshots of the secondary replica on the secondary storage system; and responsive to a disaster recovery situation, recovering the primary replica by synchronizing at least one of the consistent snapshots on the primary storage system with at least one of the consistent snapshots on the secondary storage system, migrating input-output (IO) traffic from the primary replica to the primary staging volume, and migrating IO traffic from the secondary replica to the secondary staging volume.

An apparatus in accordance with some implementations comprises: a primary storage system comprising at least one compute node configured to manage access to an array of non-volatile drives on which a primary replica of a storage object is maintained, the primary storage system configured to generate consistent snapshots of the primary replica; a secondary storage system comprising at least one compute node configured to manage access to an array of non-volatile drives on which a secondary replica of the storage object is maintained, the secondary storage system configured to generate consistent snapshots of the secondary replica; and the primary storage system and secondary storage system configured, responsive to a disaster recovery situation, to recover the primary replica by synchronizing at least one of the consistent snapshots on the primary storage system with at least one of the consistent snapshots on the secondary storage system, migrating input-output (IO) traffic from the primary replica to the primary staging volume, and migrating IO traffic from the secondary replica to the secondary staging volume.

In accordance with some implementations, a non-transitory computer-readable storage medium stores instructions that when executed by compute nodes in a storage array performs a method comprising: maintaining a primary replica of a storage object on a primary storage system; generating consistent snapshots of the primary replica on the primary storage system; maintaining a secondary replica of the storage object on a secondary storage system; generating consistent snapshots of the secondary replica on the secondary storage system; and responsive to a disaster recovery situation, recovering the primary replica by synchronizing at least one of the consistent snapshots on the primary storage system with at least one of the consistent snapshots on the secondary storage system, migrating input-output (IO) traffic from the primary replica to the primary staging volume, and migrating IO traffic from the secondary replica to the secondary staging volume.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
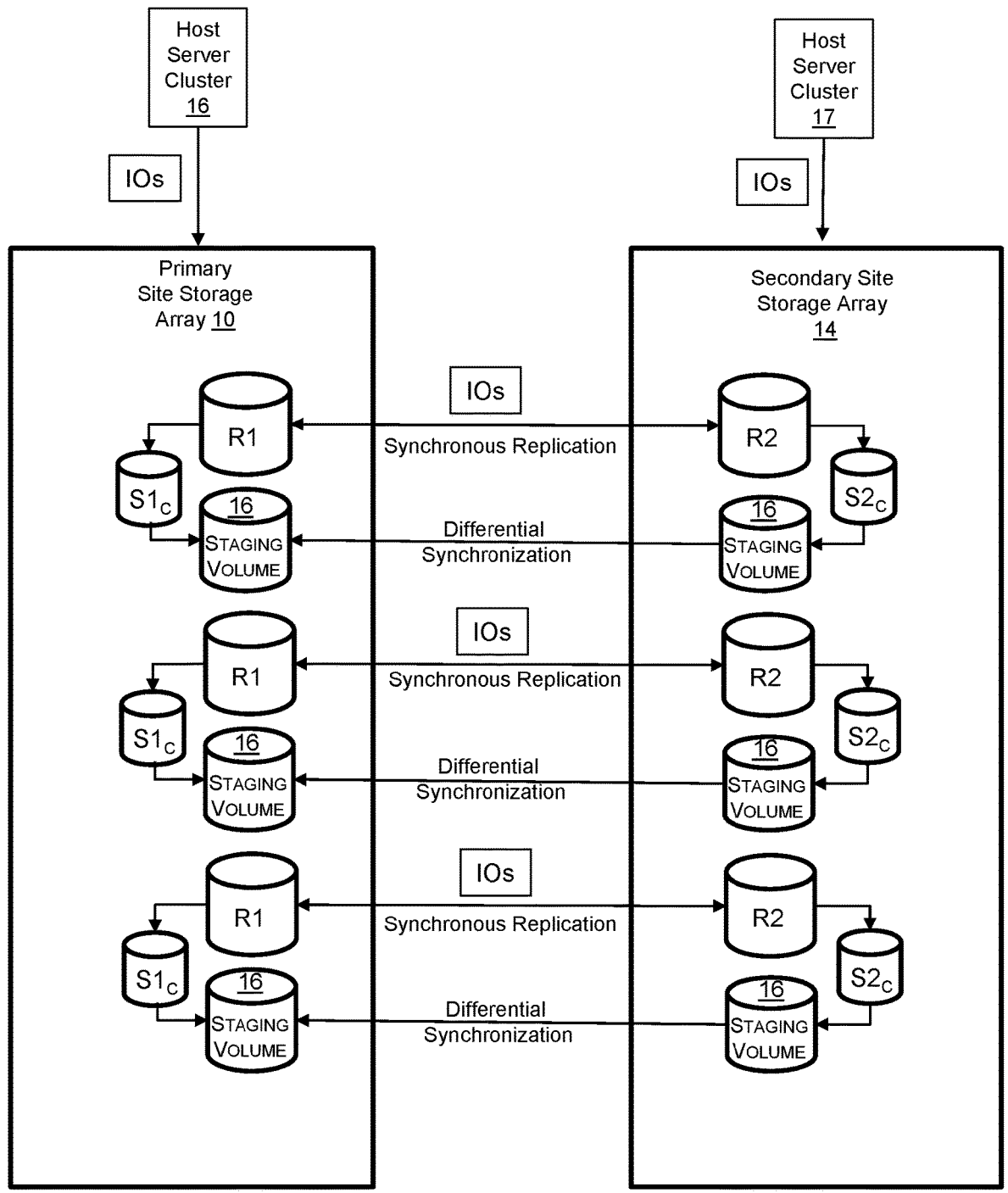
FIG. 1 illustrates a storage system in which recovery of a primary image of a group of replicated storage objects is facilitated by synchronizing consistent snapshots maintained at a primary site with consistent snapshots maintained at a secondary site.

FIG. 1 illustrates a storage system in which recovery of a primary image of replicated storage objects is facilitated by synchronizing consistent snapshots maintained at a primary site with corresponding consistent snapshots maintained at a secondary site. A primary storage array 10 and a secondary storage array 14 are configured to synchronously replicate production storage objects associated with a replication consistency group. A replication consistency group (RCG) is a logical container for volumes containing host application data for which updates are applied at the destination only when the destination has a consistent image in the journal. A consistency group ensures that all writes to the production volume are also written to the remote replicas in correct write-order and in a consistent way, so the replica can be used instead of the production volume. The volumes within the RCG are snapped together so that the entire image can be recovered to the same point in time. Primary replicas R1 of the production storage objects that are maintained on the primary storage array 10 contain host application data that is accessed by instances of a host application running on a cluster 16 of host servers. Secondary replicas R2 of the storage objects that are maintained on the secondary storage array 14 contain host application data that is accessed by instances of a host application running on a cluster 17 of host servers. The secondary replicas R2 are updated synchronously in response to updates to the primary replicas R1 caused by IOs from the host servers in cluster 16. The primary replicas R1 are updated synchronously in response to updates to the secondary replicas R2 caused by IOs from the host servers in cluster 17. Synchronous replication is performed by implementing updates in parallel on the storage arrays. For example, a write IO from a host initiator in either cluster 16 or cluster 17 is forwarded by the receiving storage array to the other storage array and only acknowledged to the host-initiator after being committed to memory by both storage arrays 10, 14.

Both storage arrays 10, 14 generate "crash-consistent" snapshots of their respective replicas R1, R2 of the storage objects according to the same schedule or consistency formation events. $S1_c$ is a consistent snapshot of a primary replica R1. $S2_c$ is a consistent snapshot of a secondary replica R2. Snapshot $S1_c$ represents the same recovery point in time as snapshot $S2_c$. The snapshots are considered to be crash-consistent because all updates prior to generation of the snapshots have been persisted to non-volatile storage. The procedure for generation of a consistent snapshot of a production storage object generally includes temporarily halting IOs from the host servers to the storage object while the consistent snapshot is created. Each snapshot represents the entire replicated storage object but may contain only the changes since the previous snapshot.

It is known to perform disaster recovery at a primary site by retrieving snapshot data from a secondary site. For example, a snapset of snapshots representative of the state of a replicated production storage object at the point in time to which the replicated storage object will be recovered can be sent from the secondary storage array to the primary storage array over a network. A drawback of this disaster recovery procedure is that, depending on the size of the snapset, a significant amount of data may need to be transmitted over a network link between the secondary storage array and the primary storage array.

The presently disclosed storage system reduces the amount of data required to be transmitted between the primary and secondary storage arrays by reconciling a snapset of consistent snapshots of the primary replicas being recovered with a corresponding snapset of consistent snapshots of the secondary replicas. The consistent snapset corresponding to the recovery point, e.g., consistent snapshots $S1_c$ of the primary replicas R1, are linked to primary staging volumes 16 on the primary storage array. The consistent snapset corresponding to the recovery point, e.g., consistent snapshots $S2_c$ of the secondary replicas R2, are linked to secondary staging volumes 16 on the secondary storage array. The corresponding pairs of staging volumes are then configured for remote synchronous replication and differentially synchronized to resolve inconsistencies. Any data differences between the staging volumes could be identified, for example, by comparing parity information. In general, however, no data of the snapsets will differ because the consistent snapshots are of a synchronously replicated storage object and taken in a coordinated manner. All the data needed to recover the primary replicas R1 will already be present at the primary site. Consequently, no data is typically required to be transmitted from the secondary storage array to the primary storage array to recover the primary replicas R1 and disaster recovery can be completed in less time than with the previous procedure. Following synchronization, host IO traffic is migrated to the staging volumes. The technique advantageously enables snapset selection and testing to be performed at the secondary site before being implemented at the primary site. Moreover, recovery can be performed with the protection of remote replication.

Figure 2:
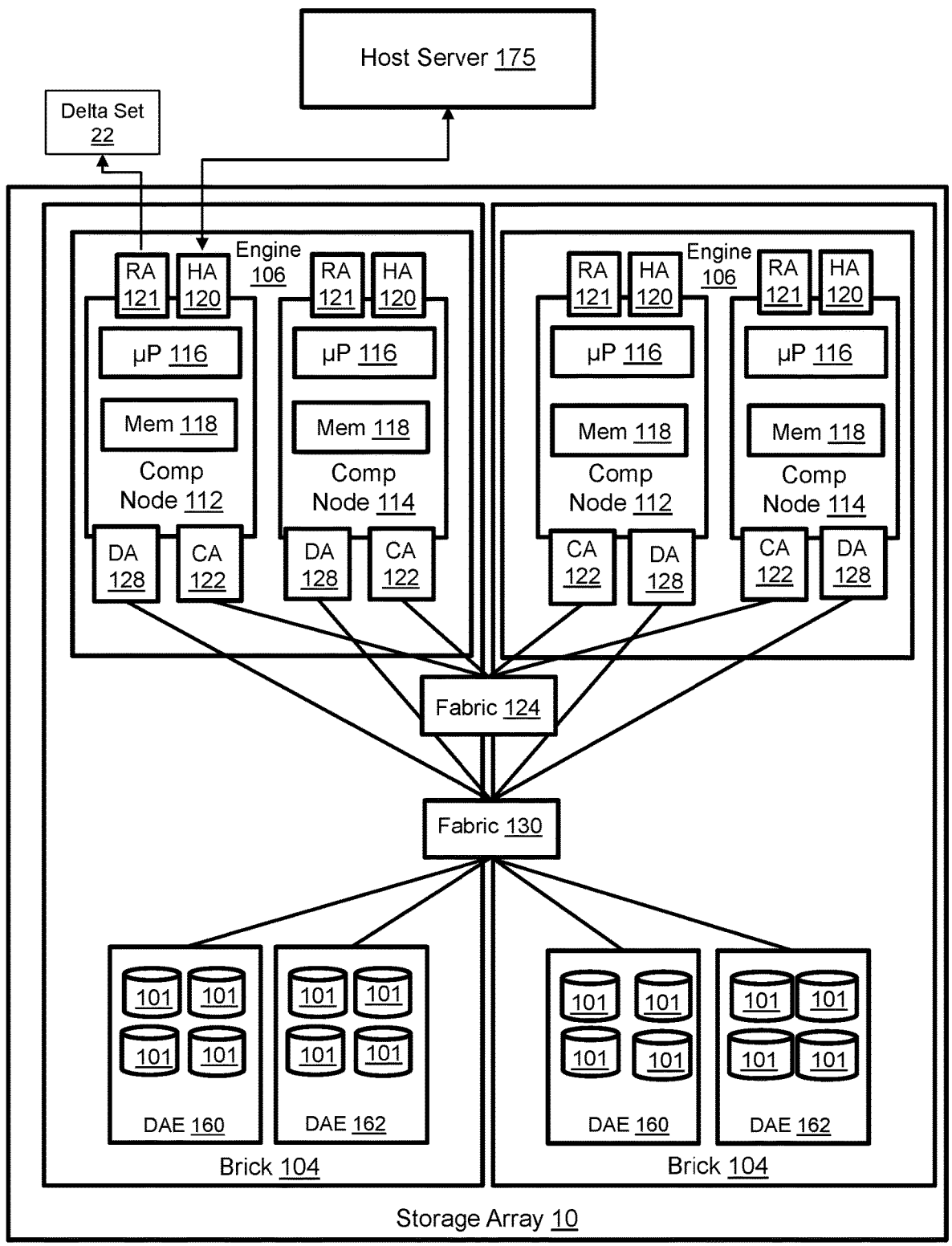
FIG. 2 illustrates the primary storage array in greater detail.

FIG. 2 illustrates the primary storage array 10 in greater detail. Both storage arrays may be substantially similar. The primary storage array includes one or more bricks 104. Each brick 104 includes an engine 106 and one or more disk array enclosures (DAEs) 160, 162. In the illustrated example there are only two engines, but the storage array could include a greater number of engines. Each engine 106 includes two interconnected compute nodes 112, 114 that are arranged as a mirrored pair for failover and may be referred to as "storage directors." Although it is known in the art to refer to the compute nodes of a SAN as "hosts," that naming convention is avoided in this disclosure to help distinguish the network server hosts from the compute nodes 112, 114. Each compute node is implemented as a separate PCB or blade and includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by all compute nodes of the storage array using direct memory access (DMA). Each compute node includes one or more host adapters (HAs) 120 for communicating with host servers such as host server 175. Each host adapter has resources for servicing input-output commands (IOs) from host servers. The host adapter resources may include processors, volatile memory, and ports via which the hosts may access the storage array. Each compute node also includes a remote adapter (RA) 121 for communicating with other storage systems, e.g., the other storage arrays for exchanging IOs for synchronous replication. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations every disk adapter 128 in the storage array can reach every DAE via the fabric 130. Further, in some implementations every disk adapter in the storage array can access every managed drive 101.

Figure 3:
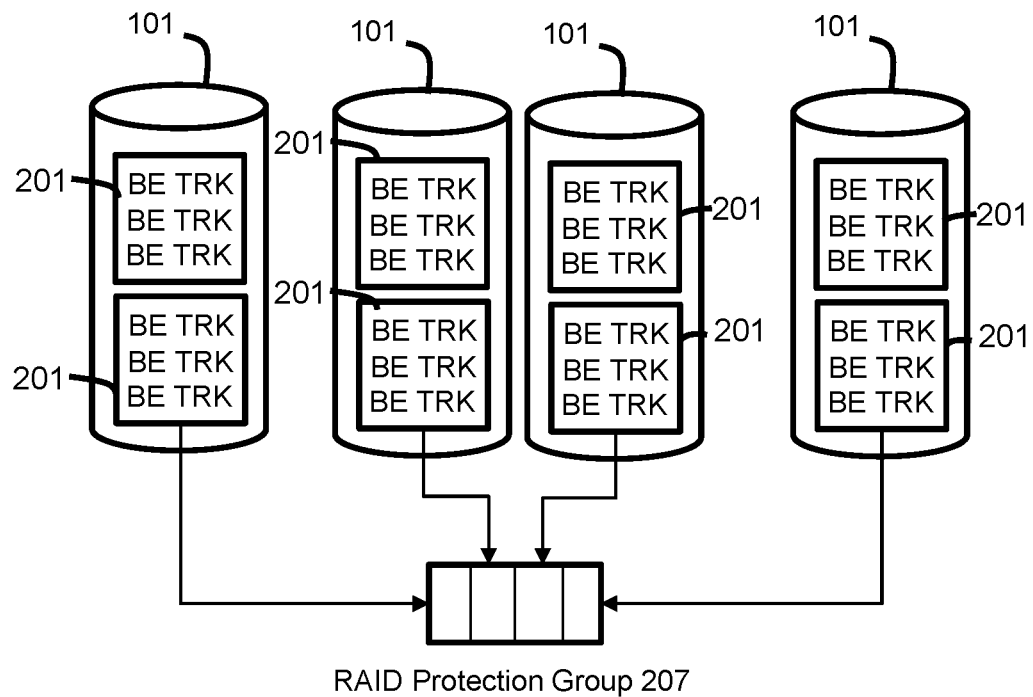
FIG. 3 illustrates layers of abstraction between the managed drives and storage objects of a storage array.
Figure 3:
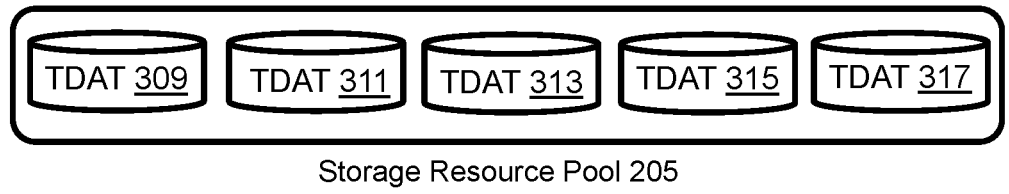
Figure 3:
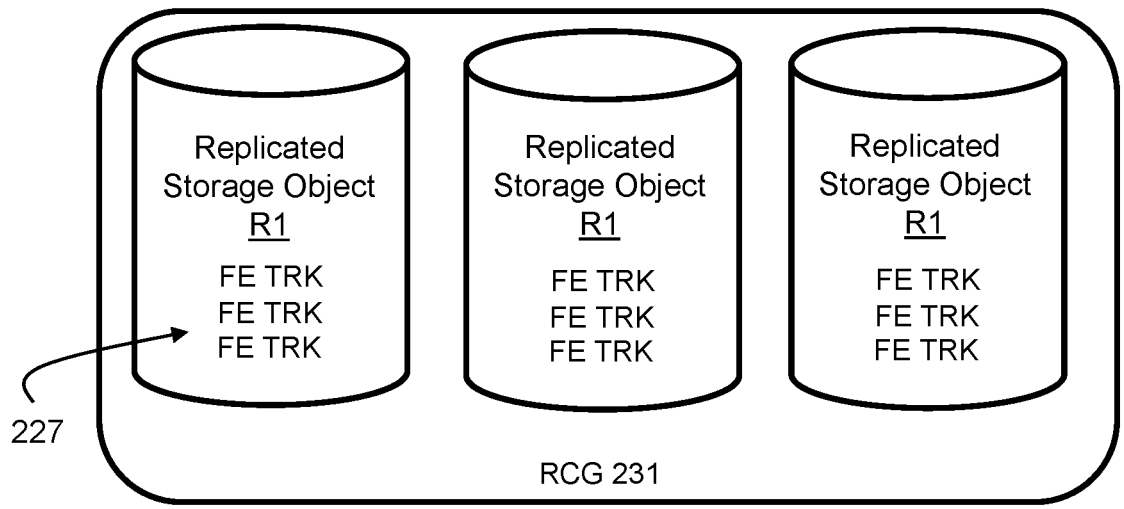

Referring to FIGS. 2 and 3, the host application data that is logically stored on the primary replicas R1 is persistently stored on the managed drives 101. Without limitation, storage objects such as replica R1 may be referred to as volumes, devices, or LUNs, where a logical unit number (LUN) is a number used to identify logical storage volumes in accordance with the small computer system interface (SCSI) protocol. From the perspective of the host servers, each production storage object is a single drive having a set of contiguous logical block addresses (LBAs) on which data used by the instances of a host application resides. However, the host application data is stored at non-contiguous addresses on various managed drives 101. A RCG 231 of multiple replicated storage objects R1 may be created for an individual host application. Multiple instances of a single host application may use data from the same storage group, but instances of different host applications do not use data from the same storage group. The storage array may maintain a large number of production storage objects and storage groups.

The compute nodes 112, 114 maintain metadata that maps between the LBAs of the production storage objects and physical addresses on the managed drives 101. The basic allocation unit of storage capacity that is used by the compute nodes 112, 114 to access the managed drives 101 is a back-end track (BE TRK). The managed drives may be configured with partitions or splits 201, each of which may contain multiple BE TRKs. A group of partitions or splits from different managed drives is used to create a RAID protection group 207. A storage resource pool 205 is a storage object that includes a collection of RAID protection groups 207 of the same type, e.g., RAID-5 (3+1). Storage resource pools are used to create the production storage objects (replica R1, 221, 223). The host application data is logically stored in front-end tracks (FE TRKs) on the production storage objects. The FE TRKs are mapped to the BE TRKs and vice versa by FE TRK IDs and BE TRK IDs, which are pointers that are maintained in the shared memory.

Figure 4:
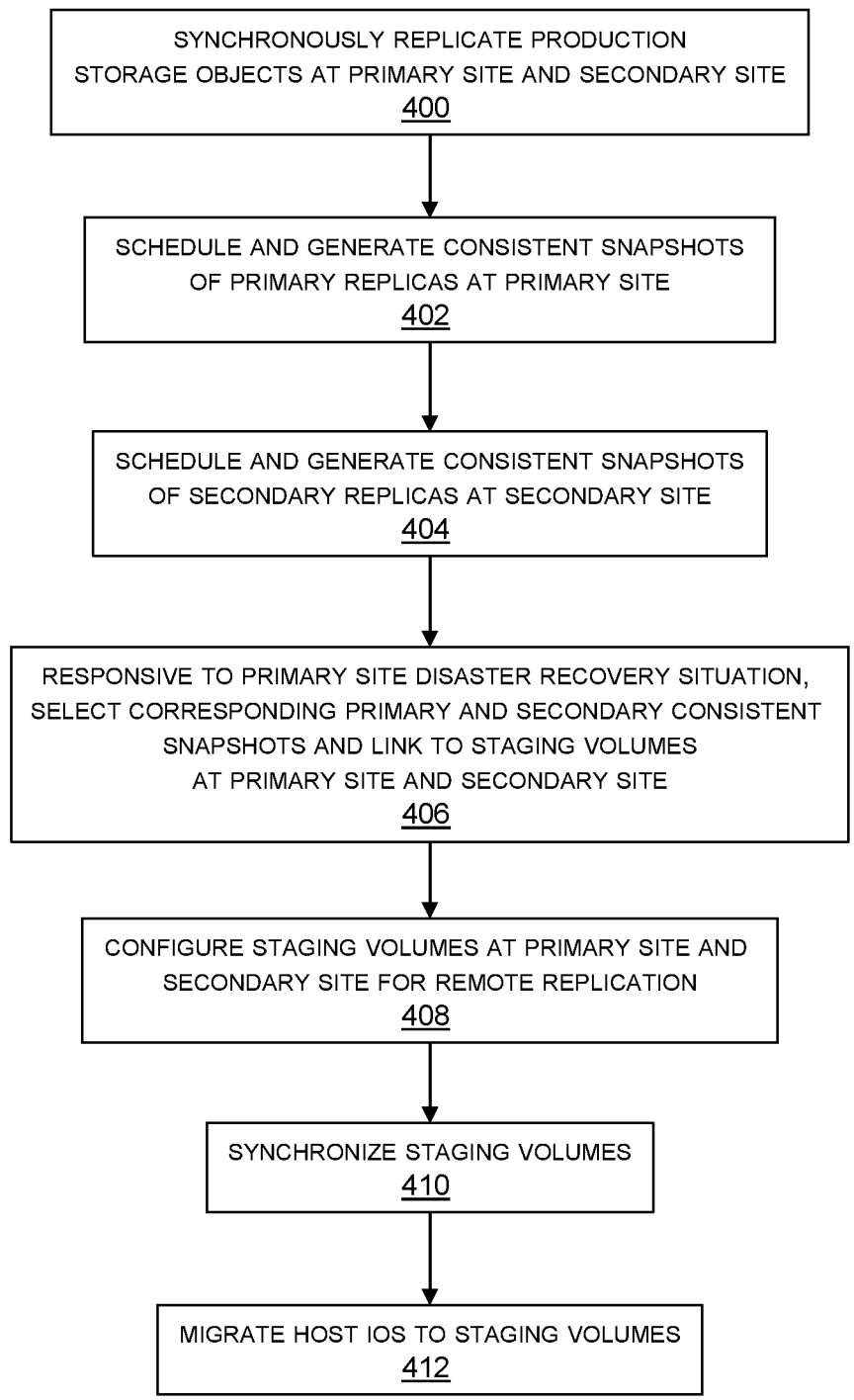
FIG. 4 illustrates a disaster recovery method based on corresponding consistent snapshots of a synchronously replicated storage object.

FIG. 4 illustrates a disaster recovery method based on corresponding consistent snapshots of a synchronously replicated storage object. Step 400 is synchronously replicating a production storage objects at primary and secondary sites. For example, primary replicas of production storage objects may be maintained by a primary storage array and secondary replicas of the storage objects may be maintained by a secondary storage array. In other implementations the sites may include other types of storage systems. The primary replicas and secondary replicas may be referred to as R1 and R2, respectively. Step 402 is scheduling and generating consistent snapshots of the primary replicas R1 at the primary site. The snapshots may be generated periodically in accordance with a predetermined schedule. Step 404 is scheduling and generating consistent snapshots of the secondary replicas R2 at the secondary site. The snapshots may be generated periodically in accordance with the same predetermined schedule. In response to a disaster recovery situation at the primary site, consistent snapshots corresponding to a recovery point are selected at the primary and secondary sites and linked to respective staging volumes as indicated in step 406. The disaster recovery situation may include corruption or loss of a primary replica R1. In step 408 the primary and secondary staging volumes are configured for remote synchronous replication. Step 410 is performing differential synchronization of the staging volumes. When the staging volumes are synchronized such that the primary site staging volumes are identical to the corresponding secondary site staging volumes, which may be nearly instantaneous, IO traffic from the host server clusters 16, 17 is migrated to the staging volumes as indicated in step 412.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:
1. A method comprising:
 maintaining a primary replica of a storage object on a primary storage system using synchronous replication by implementing updates to the primary replica in parallel with updates to a secondary replica, the pri- mary replica of the storage object being a first logical disk drive that is the target of host input-output (IO) traffic from instances of host applications running on a first group of host servers;

generating consistent snapshots of the primary replica on the primary storage system, each snapshot being a mountable volume;

maintaining the secondary replica of the storage object on a secondary storage system using synchronous replication by implementing updates to the secondary replica in parallel with updates to the primary replica, the secondary replica of the storage object being a second logical disk drive that is the target of host IO traffic from instances of host applications running on a second group of host servers;

generating consistent snapshots of the secondary replica on the secondary storage system, each snapshot being a mountable volume, the consistent snapshots of the primary replica on the primary storage system being identical to the consistent snapshots of the secondary replica on the secondary storage system; and responsive to a disaster recovery situation at the primary storage system in which the primary replica becomes unusable, recovering to a recovery point by:
  selecting consistent snapshots on the primary storage system and corresponding identical consistent snapshots on the secondary storage system corresponding to the recovery point;
  linking the selected consistent snapshots on the primary storage system with a mountable primary staging volume on the primary storage system;
  linking the selected corresponding identical consistent snapshots on the secondary storage system with a mountable secondary staging volume on the secondary storage system;
  migrating the host IO traffic of the first group of host servers from the primary replica to the primary staging volume; and
  migrating the host IO traffic of the second group of host servers from the secondary replica to the secondary staging volume;
  whereby disaster recovery is accomplished without data resynchronization between the primary replica and the secondary replica.

2. The method of claim 1 further comprising generating the consistent snapshots of the primary replica on the primary storage system and generating the consistent snapshots of the secondary replica on the secondary storage system according to a common schedule.

3. The method of claim 1 further comprising selecting a primary snapset of the consistent snapshots of the primary replica on the primary storage system and linking the primary snapset to a primary staging volume on the primary storage system.

4. The method of claim 3 further comprising selecting a secondary snapset of the consistent snapshots of the secondary replica on the secondary storage system and linking the secondary snapset to a secondary staging volume on the secondary storage system.

5. The method of claim 4 further comprising configuring the primary staging volume and the secondary staging volume for differential remote replication.

6. The method of claim 5 further comprising synchronizing the primary staging volume with the secondary staging volume.

7. An apparatus comprising:
  a primary storage system comprising at least one compute node configured to manage access to an array of non-volatile drives on which a primary replica of a storage object is maintained using synchronous replication by implementing updates to the primary replica in parallel with updates to a secondary replica, the primary replica of the storage object being a first logical disk drive that is the target of host input-output (IO) traffic from instances of host applications running on a first group of host servers, the primary storage system configured to generate consistent snapshots of the primary replica, each snapshot being a mountable volume;
  a secondary storage system comprising at least one compute node configured to manage access to an array of non-volatile drives on which the secondary replica of the storage object is maintained using synchronous replication by implementing updates to the secondary replica in parallel with updates to the primary replica, the secondary replica of the storage object being a second logical disk drive that is the target of host IO traffic from instances of host applications running on a second group of host servers, the secondary storage system configured to generate consistent snapshots of the secondary replica, each snapshot being a mountable volume, the consistent snapshots of the primary replica on the primary storage system being identical to the consistent snapshots of the secondary replica on the secondary storage system; and
  the primary storage system and secondary storage system configured, responsive to a disaster recovery situation at the primary storage system in which the primary replica becomes unusable, to recover to a recovery point by:
    selecting consistent snapshots on the primary storage system and corresponding identical consistent snapshots on the secondary storage system corresponding to the recovery point;
    linking the selected consistent snapshots on the primary storage system with a mountable primary staging volume on the primary storage system;
    linking the selected consistent snapshots on the secondary storage system with a mountable secondary staging volume on the secondary storage system;
    migrating the host IO traffic of the first group of host servers from the primary replica to the primary staging volume; and
    migrating the host IO traffic of the second group of host servers from the secondary replica to the secondary staging volume;
    whereby disaster recovery is accomplished without data resynchronization between the primary replica and the secondary replica.

8. The apparatus of claim 7 further comprising the primary storage system configured to generate the consistent snapshots of the primary replica and the secondary storage system configured to generate the consistent snapshots of the secondary replica on the secondary storage system according to a common schedule.

9. The apparatus of claim 7 further comprising the primary storage system configured to select a primary snapset of the consistent snapshots of the primary replica and link the primary snapset to a primary staging volume.

10. The apparatus of claim 9 further comprising the secondary storage system configured to select a secondary snapset of the consistent snapshots of the secondary replica and link the secondary snapset to a secondary staging volume.

11. The apparatus of claim 10 further comprising the primary storage system and the secondary storage system adapted to configure the primary staging volume and the secondary staging volume for differential remote replication.

12. The apparatus of claim 11 further comprising the primary storage system and the secondary storage system adapted to synchronize the primary staging volume with the secondary staging volume.

13. A non-transitory computer-readable storage medium storing instructions that when executed by compute nodes in a storage system perform a method comprising:
   maintaining a primary replica of a storage object on a primary storage system using synchronous replication by implementing updates to the primary replica in parallel with updates to a secondary replica, the primary replica of the storage object being a first logical disk drive that is the target of host input-output (IO) traffic from instances of host applications running on a first group of host servers;
   generating consistent snapshots of the primary replica on the primary storage system, each snapshot being a mountable volume;
   maintaining the secondary replica of the storage object on a secondary storage system using synchronous replication by implementing updates to the secondary replica in parallel with updates to the primary replica, the secondary replica of the storage object being a second logical disk drive that is the target of host IO traffic from instances of host applications running on a second group of host servers;
   generating consistent snapshots of the secondary replica on the secondary storage system, each snapshot being a mountable volume, the consistent snapshots of the primary replica on the primary storage system being identical to the consistent snapshots of the secondary replica on the secondary storage system; and
   responsive to a disaster recovery situation at the primary storage system in which the primary replica becomes unusable, recovering to a recovery point by:
      selecting consistent snapshots on the primary storage system and corresponding identical consistent snapshots on the secondary storage system corresponding to the recovery point;
      linking the selected consistent snapshots on the primary storage system with a mountable primary staging volume on the primary storage system;
      linking the selected corresponding identical consistent snapshots on the secondary storage system with a mountable secondary staging volume on the secondary storage system;
      migrating the host IO traffic of the first group of host servers from the primary replica to the primary staging volume; and
      migrating the host IO traffic of the second group of host servers from the secondary replica to the secondary staging volume;
      whereby disaster recovery is accomplished without data resynchronization between the primary replica and the secondary replica.

14. The non-transitory computer-readable storage medium of claim 13 in which the method further comprises generating the consistent snapshots of the primary replica on the primary storage system and generating the consistent snapshots of the secondary replica on the secondary storage system according to a common schedule.

15. The non-transitory computer-readable storage medium of claim 13 in which the method further comprises selecting a primary snapset of the consistent snapshots of the primary replica on the primary storage system and linking the primary snapset to a primary staging volume on the primary storage system.

16. The non-transitory computer-readable storage medium of claim 15 in which the method further comprises selecting a secondary snapset of the consistent snapshots of the secondary replica on the secondary storage system and linking the secondary snapset to a secondary staging volume on the secondary storage system.

17. The non-transitory computer-readable storage medium of claim 16 in which the method further comprises configuring the primary staging volume and the secondary staging volume for differential remote replication and synchronizing the primary staging volume with the secondary staging volume.

* * * * *